United States Patent [19]

Okaniwa et al.

[11] 3,942,946

[45] Mar. 9, 1976

[54] BLACK DYEING OF ACID-MODIFIED POLYESTER FIBER

[75] Inventors: Tetuo Okaniwa, Minoo; Sadaharu Abeta, Toyonaka, both of Japan

[73] Assignee: Sumitomo Chemical Company, Ltd., Osaka, Japan

[22] Filed: Feb. 5, 1975

[21] Appl. No.: 547,152

[30] Foreign Application Priority Data

Feb. 5, 1974 Japan.............................. 49-15095

[52] U.S. Cl. ................................. 8/26; 8/168 C
[51] Int. Cl.² ......................................... D06P 1/08
[58] Field of Search ..................... 8/25, 26, 168 C

[56] References Cited
UNITED STATES PATENTS

| | | | |
|---|---|---|---|
| 3,413,075 | 11/1968 | Rotcop et al. ............................ | 8/26 |
| 3,874,847 | 4/1975 | Ohkawa et al. ......................... | 8/41 C |

FOREIGN PATENTS OR APPLICATIONS

| | | |
|---|---|---|
| 808,308 | 2/1959 | United Kingdom |
| 15,791 | 4/1971 | Japan |
| 2,002,609 | 8/1970 | Germany |
| 1,044,023 | 11/1958 | Germany |
| 1,050,940 | 2/1959 | Germany |
| 1,077,808 | 3/1960 | Germany |

Primary Examiner—Donald Levy
Assistant Examiner—A. L. Clingman
Attorney, Agent, or Firm—Sughrue, Rothwell, Mion, Zinn & Macpeak

[57] ABSTRACT

A process for dyeing "acid-modified" polyester fibers, such as "Dacron T-64" fibers, a black color comprising contacting the polyester fibers with a dye bath containing a combination of four kinds of dyes.

12 Claims, No Drawings

BLACK DYEING OF ACID-MODIFIED POLYESTER FIBER

BACKGROUND OF THE INVENTION

1. Field Of The Invention

The present invention relates to a process for dyeing polyester fibers which have been modified so that they can be dyed with cationic dyes, and more particularly to a process for dyeing acid-modified polyester fibers a black color.

2. Description Of The Prior Art

Polyester fibers have been widely used as synthetic fibers for fiber goods because of their excellent properties, but it has been difficult to dye polyester fibers a clear and deep color.

Of various dyes, those dyes which give the most brilliant and deep color are cationic dyes for polyacrylonitrile fibers. For the purpose of dyeing polyester fibers also a brilliant and deep color, investigations have been made to render the fibers dyeable with cationic dyes. For example, Japanese Patent Publication No. 10497/1959 discloses a modification such as copolymerization using sulfoisophthalic acid as an acidic material as one approach toward rendering polyester fibers dyeable with cationic dyes.

However, when modified polyester fibers are dyed with dyes which have been widely used as cationic dyes for polyacrylonitrile, the exhaustion, particularly in black-dyeing, is so unsatisfactory that the fibers can not be dyed a deep black color. Furthermore, when blends or unions between the acid-modified polyester fibers and other fibers are dyed with conventional cationic dyes, staining of fibers other than the modified polyester fibers is observed remarkably.

Examples of commercially available black cationic dyes for polyacrylonitrile fibers are exemplified by the following dye combinations:

(1)

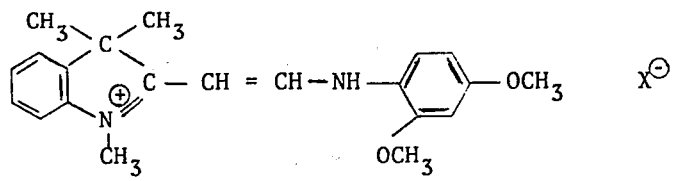

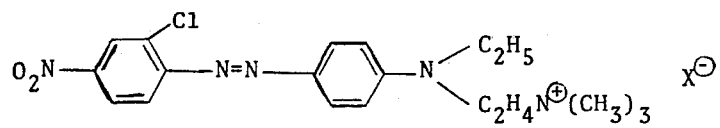

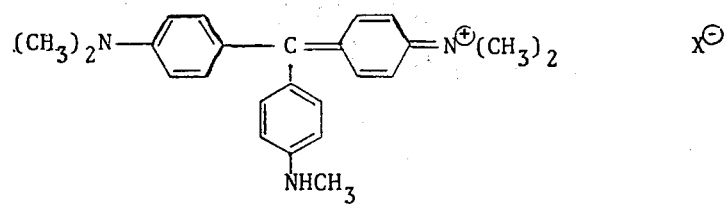

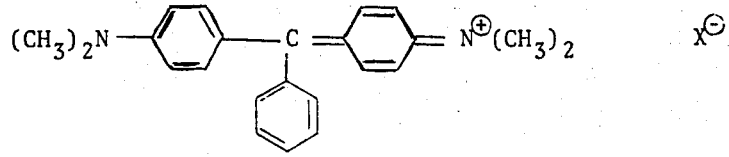

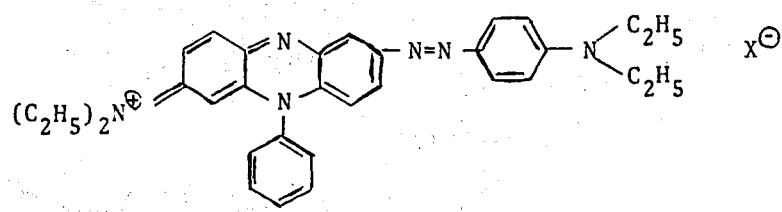

(2)
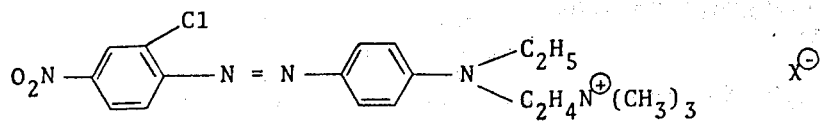
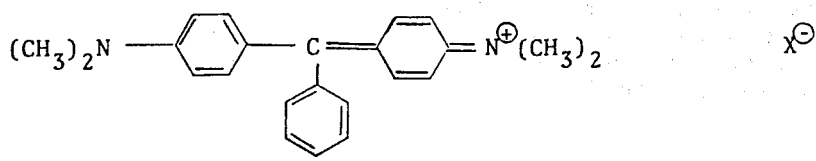
(3)
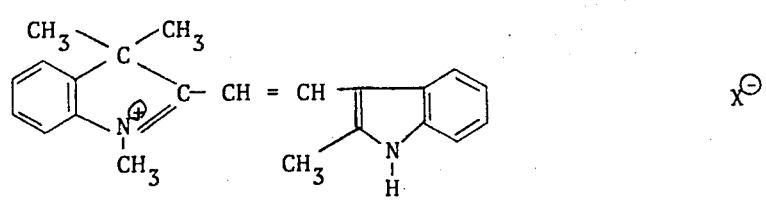
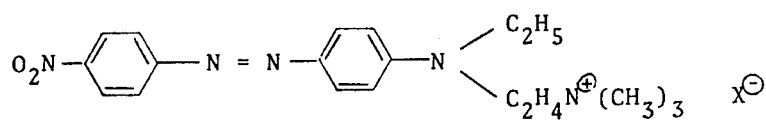
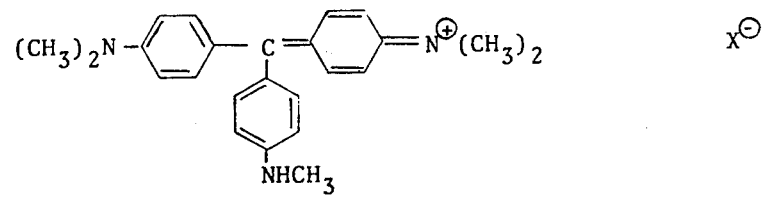
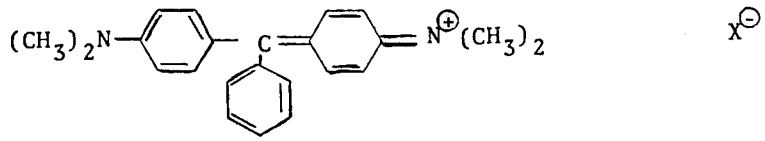
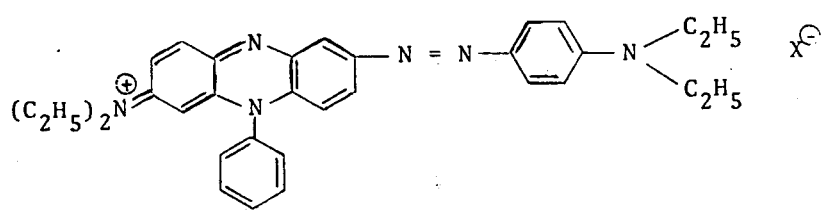
(4)
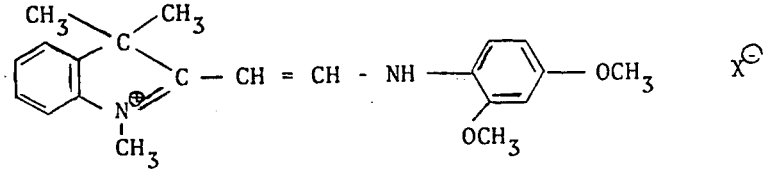
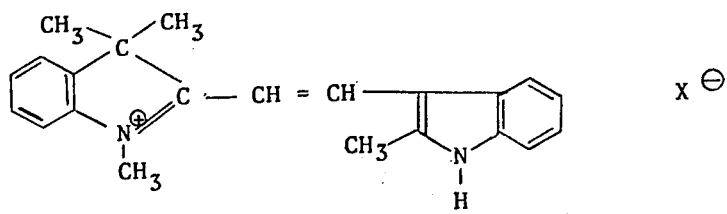
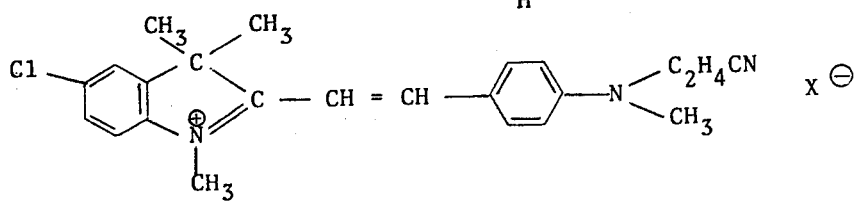

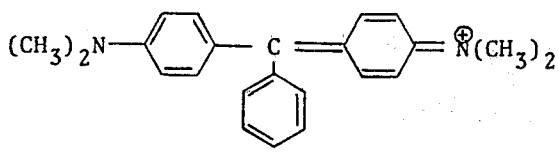 $X^\ominus$ (5) 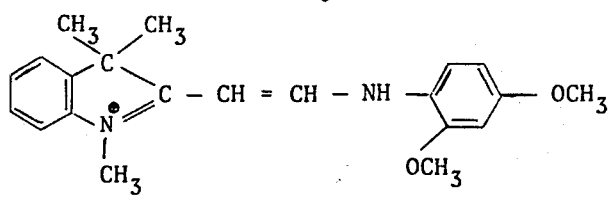 $X^\ominus$

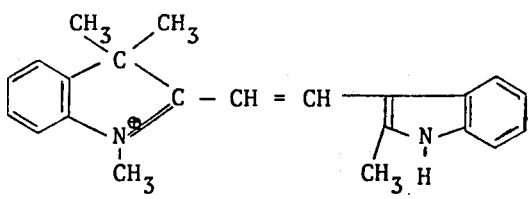 $X^\ominus$

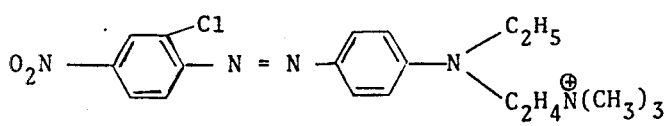 $X^\ominus$

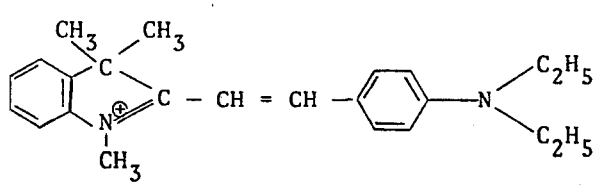 $X^\ominus$

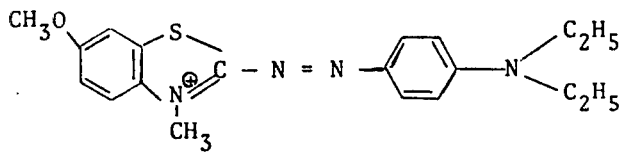 $X^\ominus$

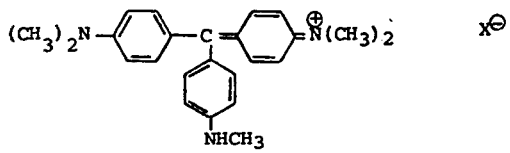 $X^\ominus$

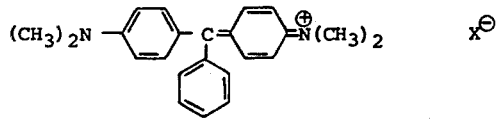 $X^\ominus$

In the above formulae, $X^\ominus$ represents an anion such as $Cl^\ominus$

These mixed black dyes are very poor in exhaustion to polyester fibers, as described above, and thus do not result in a deep black color, and moreover a large degree of staining of other fibers which are present together with the polyester fibers results when these dyes are used.

Investigations have been made on a method for dyeing acid-modified polyester fibers a deep black color, and it has been found that deep black dyeings of extremely high color value can be obtained using a dye bath containing a specific combination of cationic dyes.

SUMMARY OF THE INVENTION

Thus, the present invention provides a process for dyeing acid-modified polyester fibers black comprising contacting the polyester fibers with a dye bath containing a combination of four kinds of dyes, the combination comprising 1. at least one yellow or orange dye of the formula (A),

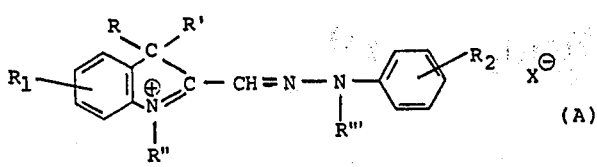

(A)

wherein R, R', R'' and R''', which may be the same or different, each is a methyl group or an ethyl group; $R_1$ is a hydrogen atom or a halogen atom; $R_2$ is a hydrogen atom, a ($C_1$–$C_3$) alkyl group or a ($C_1$–$C_3$) alkoxy group; and $X^{\ominus}$ is an anion; of the formula (B)

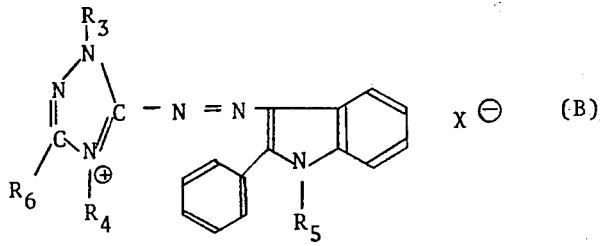

(B)

wherein $R_3$, $R_4$ and $R_5$, which may be the same or different, each is a ($C_1$–$C_3$)alkyl group or an aralkyl group, in which each of the groups may be substituted with a halogen atom, a hydroxyl group or a lower alkoxy group; $R_6$ is a hydrogen atom or a carboxyl group; and $X^{\ominus}$ is an anion; and of the formula (C)

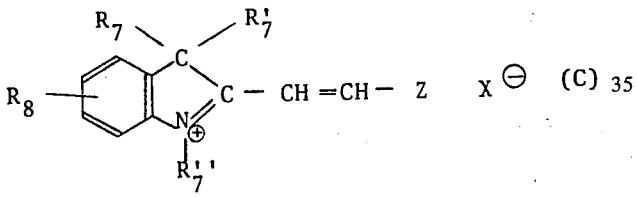

(C)

wherein Z is a nitrogen atom-containing monoheterocyclic ring which may be substituted with a lower alkyl group or a lower alkoxy group, $R_7$, $R_7'$ and $R_7''$, which may be the same or different, each is a methyl group or an ethyl group; $R_8$ is a hydrogen atom or a halogen atom; and $X^{\ominus}$ is an anion;

2. at least one red dye of the formula (D)

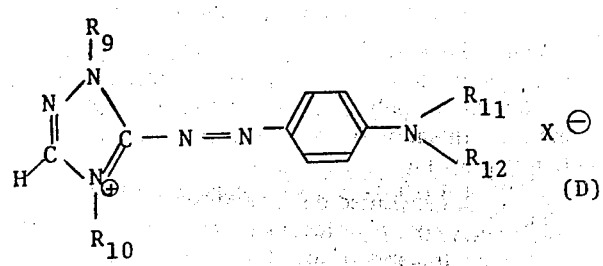

(D)

wherein $R_9$, $R_{10}$, $R_{11}$ and $R_{12}$, which may be the same or different, each is a ($C_1$–$C_3$) alkyl group or an aralkyl group, in which each of the groups may be substituted with a halogen atom, a hydroxyl group or a lower alkoxy group; and $X^{\ominus}$ is an anion; and of the formula (E)

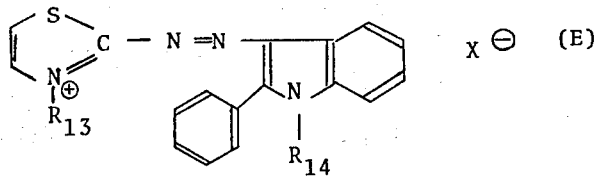

(E)

wherein $R_{13}$ and $R_{14}$, which may be the same or different, each is a ($C_1$–$C_3$)alkyl group, which may be substituted with a halogen atom, a hydroxyl group or a lower alkoxy group; and $X^{\ominus}$ is an anion; (3) at least one violet to blue dye of the formula (F)

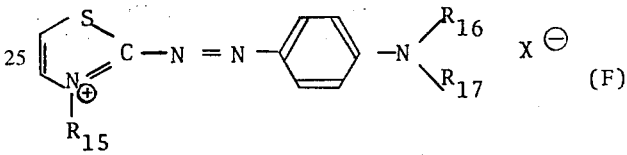

(F)

wherein $R_{15}$ is a ($C_1$–$C_3$)alkyl group which may be substituted with a halogen atom, a hydroxyl group, a carbamoyl group or a lower alkoxy group; $R_{16}$ and $R_{17}$, which may be the same or different, each is a ($C_1$–$C_3$)alkyl group or an aralkyl group, in which each of the groups may be substituted with a halogen atom, a hydroxyl group or a lower alkoxy group; and $X^{\ominus}$ is an anion; and (4) at least one dye of the formula (G),

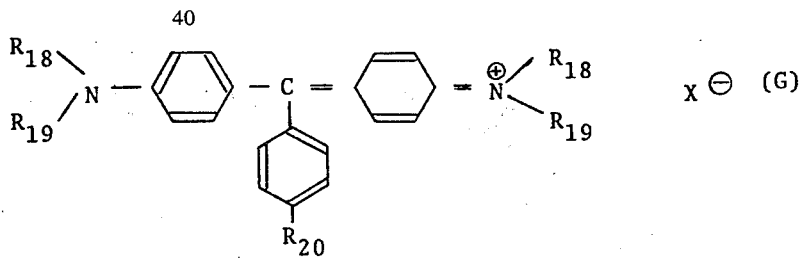

(G)

wherein $R_{18}$ and $R_{19}$, which may be the same or different, each is a ($C_1$–$C_3$)alkyl group or an aralkyl group, in which each of the groups may be substituted with a halogen atom, a hydroxyl group or a cyano group; $R_{20}$ is a hydrogen atom or an amino group which may be substituted with an alkyl group or a phenyl group; and $X^{\ominus}$ is an anion.

DETAILED DESCRIPTION OF THE INVENTION

As used herein, the term "lower" is used to describe groups having 1 to 4 carbon atoms.

As described above, the black dyeing bath used in the process of this invention contains four kinds of specific dyes, and if the dyeing bath lacks even one of the four kinds of dyes specified in this invention, modified polyester fibers are not dyed a deep black color.

The dyes represented by the formula (A) are well known as dyes for polyacrylonitrile fibers, and can be prepared according to the method disclosed in, for example, West German Patent No. 1,083,000.

Specific examples of dyes represented by the formula (A) are as follows:

(A) - (1)

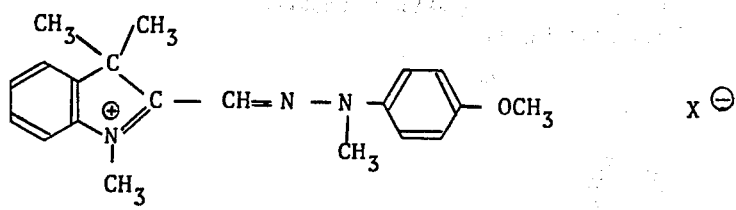

(A) - (2)

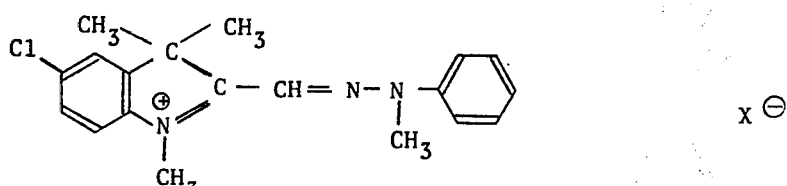

(A) - (3)

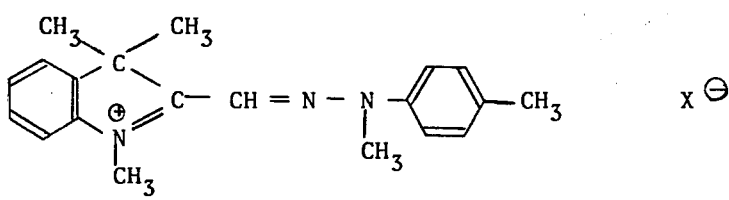

wherein $X^{\ominus}$ is an anion, such as $CH_3SO_4^-$.

The dyes represented by the formula (B) are well known as dyes for polyacrylonitrile fibers, and can be prepared according to the method disclosed in, for example, West German Patent Nos. 1,044,023 and 1,077,808.

Specific examples of dyes represented by the formula (B) are as follows:

(B) - (1)

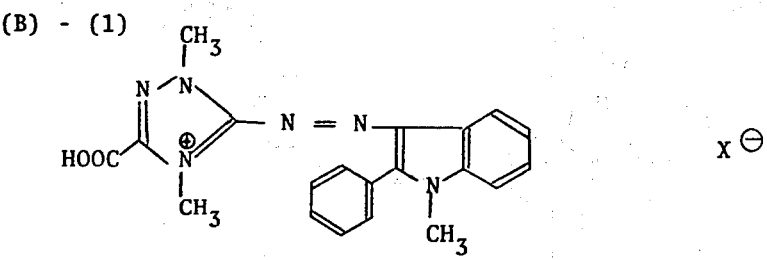

(B) - (2)

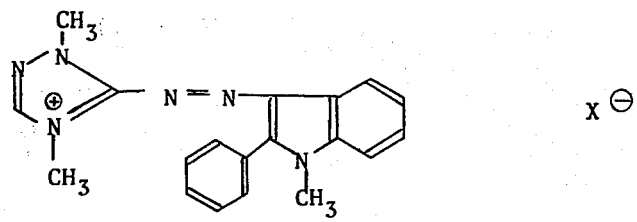

(B) - (3)

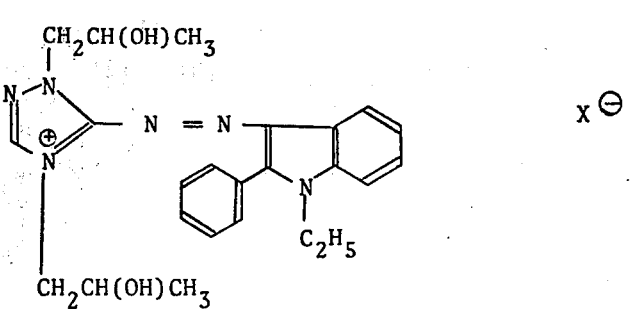

wherein $X^\ominus$ is an anion such as $CH_3SO_4^-$ or $ZnCl_3^-$.

Dyes represented by the formula (C) are also well known as dyes for polyacrylonitrile fibers, and can be prepared according to the methods disclosed in British Patent No. 808,308, and German Patent Application OLS No. 2,002,609. The dyes of the formula (C) include an indole ring or an indoline ring as 7.

Specific examples of dyes represented by the formula (C) are as follows:

wherein $X^\ominus$ is an anion such as $Cl^-$

Dyes represented by the formula (D) are also well known as dyes for polyacrylonitriles fibers, and can be prepared according to the method disclosed in Japanese Patent Publication No. 2387/1957.

Specific examples of dyes represented by the formula (D) are as follows:

(C) - (1)

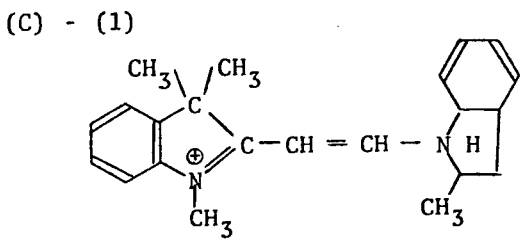 

(C) - (2)

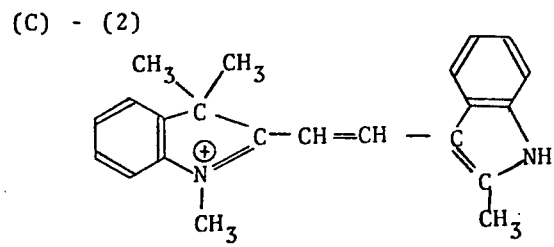 

(C) - (3)

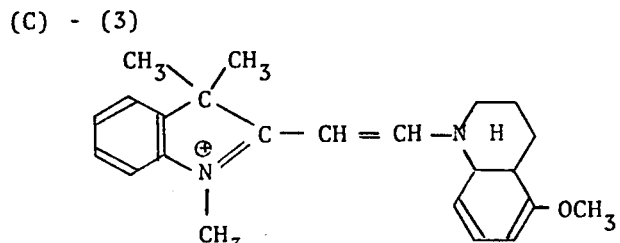 

(C) - (4)

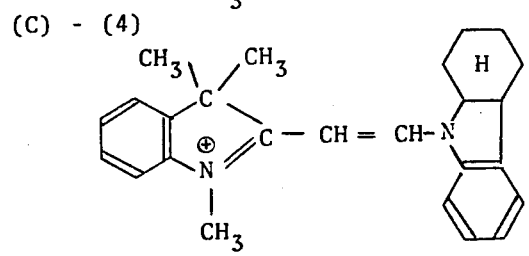 

(D) - (1)

 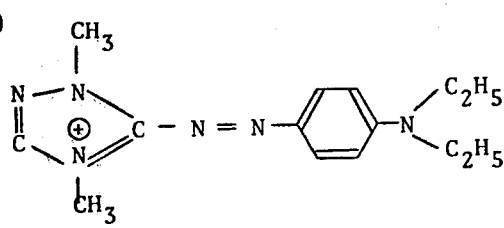 

(D) - (2)

 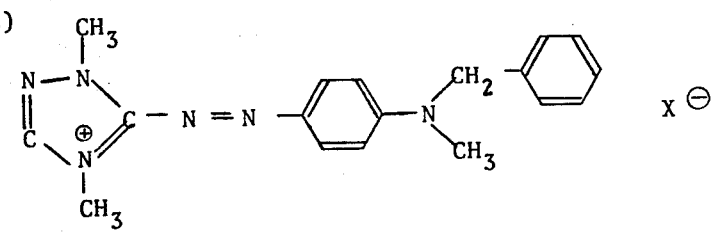

(D) - (3)

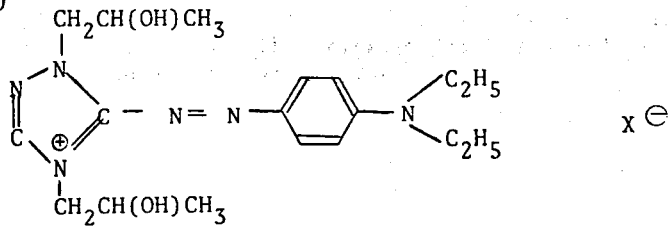

wherein X⊖ is an anion such as $CH_3SO_4^-$ or $Cl^-$.

Dyes represented by the formula (E) are also well known as dyes for polyacrylonitrile fibers, and can be prepared according to the method disclosed in Japanese Patent Publication No. 6933/1959.

Specific examples of dyes represented by the formula (E) are as follows:

(E) - (1)

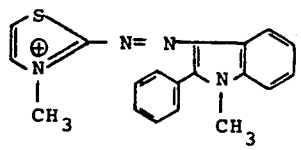

(E) - (2)

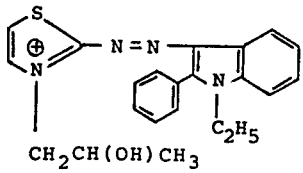

(E) - (3)

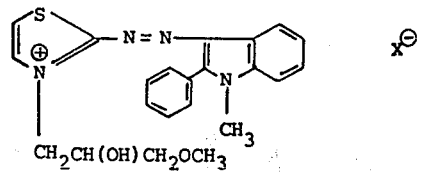

wherein X⊖ is an anion such as $CH_3SO_4^-$ or $Cl^-$.

Dyes represented by the formula (F) are also well known as dyes for polyacrylonitrile fibers, and can be prepared according to the methods disclosed in Japanese Patent Publication Nos. 2388/1957 and 15,791/1971.

Specific examples of dyes represented by the formula (F) are as follows:

(F) - (1)

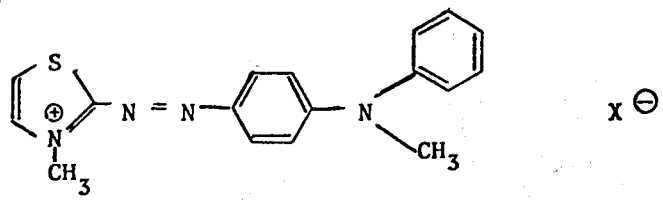

(F) - (2)

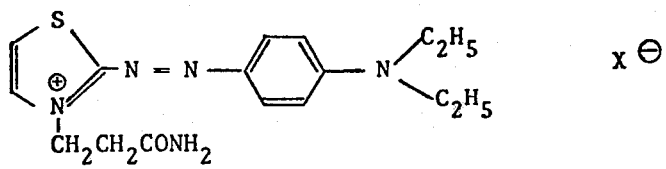

(F) - (3)

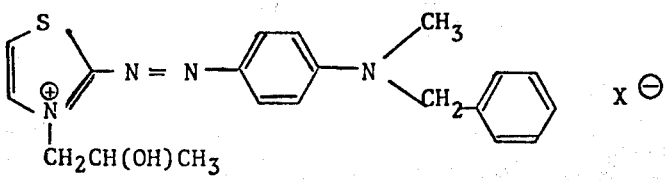

wherein X is an anion such as $CH_3SO_4^-$ or $Cl^-$.

Dyes represented by the formula (G) are well known as basic dyes and specifically include the following dyes:

(G) - (1)

Malachite Green

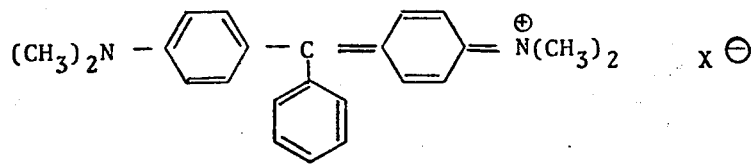

(G) - (2)

Diamond Green

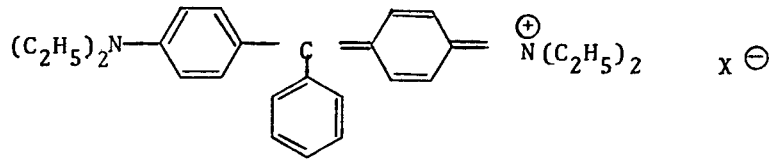

(G) - (3)

Methyl Violet

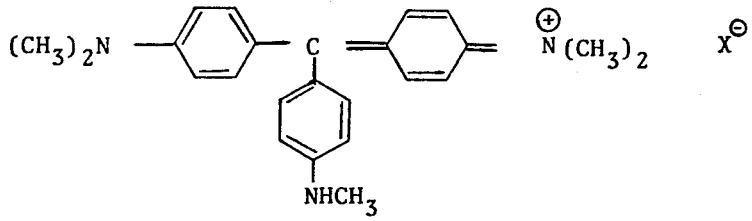

(G) - (4)

Crystal Violet

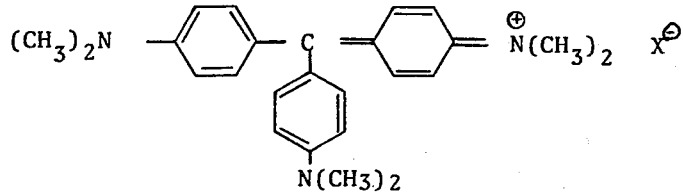

wherein $X^\ominus$ is an anion such as Cl.

In practice of the black-dyeing process according to the present invention, at least the four dye components as described above are essential but, if desired, other cationic dyes of different chemical structures can be incorporated in the dyeing bath for toning. Suitable examples of such cationic dyes include specifically the following dyes:

Toning Dye A

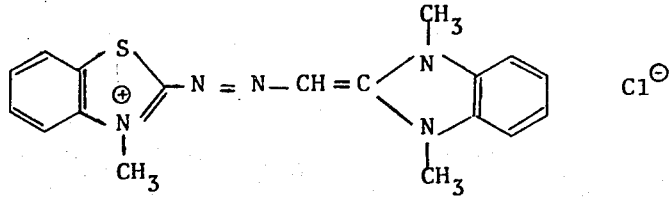

Toning Dye B

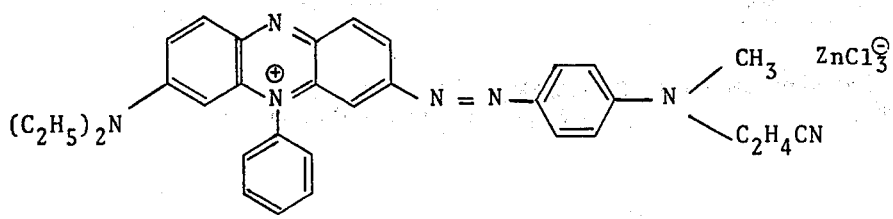

Toning Dye C

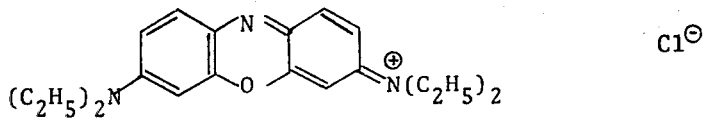

Moreover, in the present invention, the four kind of dyes can, of course, be blended initially and the blend can be used as a blended black dye. Although the amount of each dye blended varies depending upon the color, shade, tinting strength and the like of the dyes, at least about 2.0% by weight of each of the kinds of dyes based on the total weight of the dyes blended is usually suitable.

The term "acid-modified polyester fiber" as used herein means a polyester fiber which has been modified by introducing an acid group such as a sulfonic acid group into the polyester so that the fibers become dyeable with cationic dyes. Specific examples of acid-modified polyester fibers are "Dacron T-64", "Dacron T-65", "Dacron T-62", "Dacron T-89", "Dacron T-92", and "Dacron T-161" (made by E. I. du Pont Nemours and Co.,), "Trevira 440" (made by Hystron), and "Kodel 511" (made by Tennessee Eastman, Inc.).

In the dyeing, the amount of each dye in the combination is at least one part by weight based on 1000 parts by weight of the acid-modified polyester fiber to be dyed.

The dyeing can be conducted using a so-called high temperature dyeing method or carrier dyeing method. That is, high temperature dyeing can be effected at a temperature of about 115° to 130°C for about 40 to 100 minutes, with the pH of the bath being adjusted to about 3.5 to 5.0 using a buffer such as sodium acetate and acetic acid. In order to prevent decomposition of the acid-modified polyester fibers during the dyeing, for example, anhydrous sodium sulfate can be added to the dye bath in an amount of about 2.0 to 6.0 g per liter of the dye bath. Carrier dyeing can be effected at a temperature of about 100° to 105°C for about 60 to 120 minutes using a carrier, such as biphenyl, butyl benzoate or o-phenylphenol, which is dispersed using a nonionic surface active agent, with the pH of the bath being adjusted to about 3.5 to 5.0 using a buffer such as sodium acetate and acetic acid. The bath weight ratio in both dyeing methods is usually about 1:10 to 1:150.

The fibers dyed can be after-treated in a conventional manner to obtain a black dyed product. Thus, the present combination of dyes dye acid-modified polyester fibers a very deep black color.

Furthermore, as in the case of 100% acid-modified polyester fiber goods, the combination of dyes according to the present invention also produce a very deep black color only for the acid-modified polyester fibers in blends or unions with wool, cotton or unmodified polyester fibers such as Tetron (a registered trade mark of Toray Industries) without staining of fibers other than the acid-modified polyester fibers, such as wool, cotton or unmodified polyester fibers.

The present invention will be explained in greater detail below with reference to the following examples, which are given only for the purposes of illustration and are not to be interpreted as limiting. In the examples, all parts, percents, ratios and the like are by weight unless otherwise indicated.

EXAMPLE 1

The following dyes were dissolved in 1000 parts by weight of hot water:

| Dye (A) - (1) | 3.8 parts |
| Dye (D) - (2) | 3.5 parts |
| Dye (F) - (1) | 3.0 parts |
| Dye (G) - (1) | 3.0 parts |

The dye solution thus obtained was diluted with 50,000 parts of water, and then 10 parts of acetic acid and 5 parts of anhydrous sodium acetate were added thereto to prepare a dye bath.

Then, 1,000 parts of silvers of Dacron T-64 were immersed in the bath, and dyeing was carried out by increasing the bath temperature to 120°C over a 40 minute period while stirring and the bath was kept at the same temperature for 60 additional minutes. After dyeing, the silvers were washed with water and dried.

Thus, Dacron T-64 was dyed a deep and fast black.

EXAMPLE 2

The dyeing procedure was carried out in the same manner as described in Example 1, except that Dacron T-92 was used in place of Dacron T-64 and that the following dye combination was used,

| Dye (B) - (2) | 4.5 parts |
| Dye (D) - (1) | 3.5 parts |
| Dye (F) - (3) | 3.0 parts |
| Dye (G) - (1) | 2.5 parts |
| Dye (G) - (2) | 0.5 parts |

Thus, Dacron T-92 was dyed a deep black.

EXAMPLE 3

The dyeing procedure was carried out in the same manner as described in Example 1, except that the following dye combination was used.

| | |
|---|---|
| Dye (C) - (2) | 3.5 parts |
| Dye (D) - (2) | 2.5 parts |
| Dye (F) - (1) | 3.0 parts |
| Dye (G) - (1) | 3.0 parts | and that 0.3 part of a dye having the following structure was additionally added as a toning dye, Toning Dye A

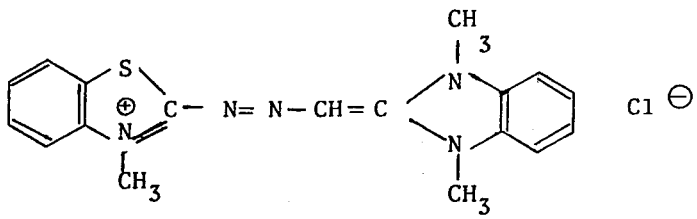

Toning Dye B

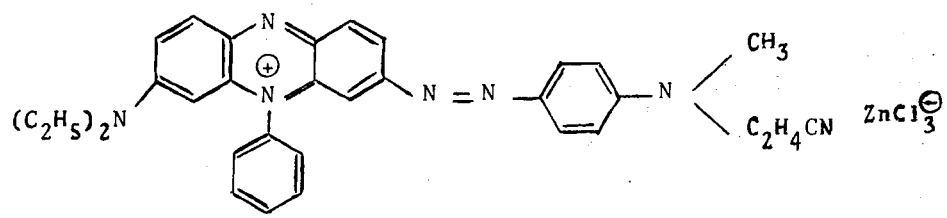

Thus, Dacron T-64 was dyed a brilliant and deep black.

EXAMPLE 4

The dyeing procedure was carried out in the same manner as described in Example 1, except that the following dye combination was used,

| | |
|---|---|
| Dye (A) - (1) | 3.8 parts |
| Dye (D) - (2) | 2.5 parts |
| Dye (E) - (3) | 1.8 parts |
| Dye (F) - (1) | 3.0 parts |
| Dye (G) - (1) | 3.0 parts | and that Dacron T-64 was replaced by 2,000 parts of a union fabric of 50% Dacron T-92 and 50% Dacron T-56 (unmodified type). Thus, the Dacron T-92 portion was dyed a very deep black while the Dacron T-56 portion was not stained at all, and dyeings which had quite a high contrast between white and black were obtained.

EXAMPLE 5

The dyeing procedure was carried out in the same manner as described in Example 1, except that the following dye combination was used,

| | |
|---|---|
| Dye (C) - (1) | 5.8 parts |
| Dye (D) - (1) | 5.0 parts |
| Dye (F) - (1) | 2.0 parts |
| Dye (G) - (1) | 1.5 parts | and that 0.7 part of a dye having the following structure was additionally added as a toning dye, Thus, Dacron T-64 was dyed a brilliant and deep black.

EXAMPLE 6

The dyeing procedure was carried out in the same manner as described in Example 1, except that the following dye combination was used,

| | |
|---|---|
| Dye (A) - (1) | 4.6 parts |
| Dye (D) - (2) | 2.5 parts |
| Dye (F) - (1) | 2.6 parts |
| Dye (G) - (1) | 1.3 parts | and 2.0 parts of a dye having the following structure was additionally added as a toning dye, Toning Dye C

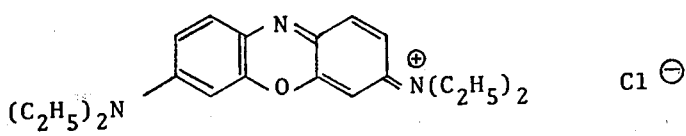

and that Dacron T-64 was replaced by 3,000 parts of a 33/33/33 union fabric of Dacron T-62 /Dacron T-56 (unmodified type) / Antron T-868 (a polyamide fiber, made by E. I. du Pont de Nemours and Co.).

Thus, the Dacron T-62 portion was dyed a very deep black while the Dacron T-56 and Antron T-868 portions were not stained at all, and dyeings which had quite a high contrast between black and white were obtained.

EXAMPLE 7

The dyeing procedure was carried out in the same manner as described in Example 1, except that the following dye combination was used,

| Dye (A) - (1) | 7.5 parts |
| Dye (D) - (2) | 4.1 parts |
| Dye (F) - (1) | 3.1 parts |
| Dye (G) - (1) | 1.7 parts | and the following dyes, Toning Dye C and Toning Dye B were additionally added as toning dyes in amounts of 3.0 and 0.8 parts, respectively, Toning Dye C

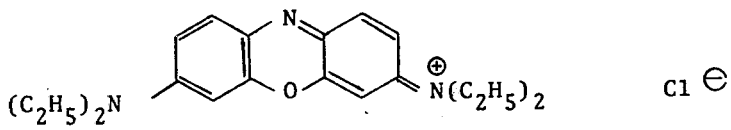

Toning Dye B

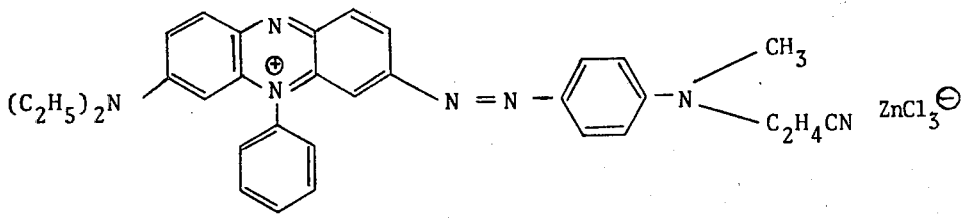

and that Dacron T-64 was replaced by 1,000 parts of Dacron T-92. Thus, Dacron T-92 was dyed a deep and fast black.

The same procedure was carried out using 3,000 parts of a 33/33/33 union fabric of Dacron T-62 / Dacron T-56 (unmodified type) / Antron T-868 (a polyamide fiber, made by E. I. du Pont de Nemours and Co.) in place of the Dacron T-92. Thus, the Dacron T-62 portion was dyed a very deep black, while both of the Dacron T-56 and Antron T-868 portions were not stained at all, and dyeings which had quite a high contrast between black and white were obtained.

While the invention has been described in detail and with reference to specific embodiments thereof, it will be apparent to one skilled in the art that various changes and modifications can be made therein without departing from the spirit and scope thereof.

What we claim is:

1. A process for dyeing acid-modified polyester fibers black comprising contacting said polyester fibers with a dye bath containing a combination of four kinds of dyes, the combination comprising, 1. at least one yellow or orange dye of the formula (A),

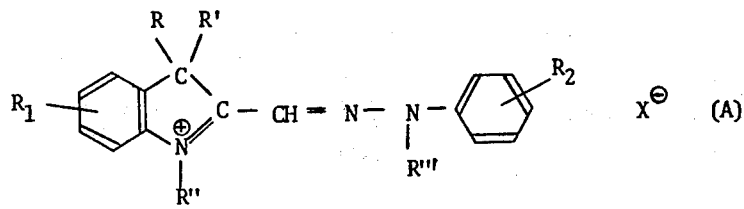

wherein R, R', R'' and R''', which may be the same or different, each is a methyl group or an ethyl group; $R_1$ is a hydrogen atom or a halogen atom; $R_2$ is a hydrogen atom or a ($C_1$-$C_3$)alkyl group or a ($C_1$-$C_3$)alkoxy group; and $X^\ominus$ is an anion; of the formula (E)

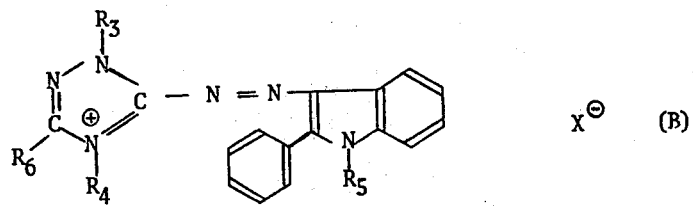

wherein $R_3$, $R_4$ and $R_5$, which may be the same or different, each is a ($C_1$-$C_3$)alkyl group or an aralkyl group, in which each of the groups may be substituted with a halogen atom, a hydroxyl group or a lower alkoxy group; $R_6$ is a hydrogen atom or a carboxyl group; and $X^-$ is an anion; and of the formmula (C)

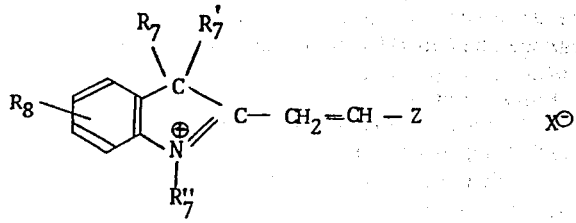

(C)

wherein Z is a nitrogen atom-containing monoheterocyclic ring which may be substituted with a lower alkyl group or a lower alkoxy group; $R_7$, $R_7'$ and $R_7''$ which may be the same or different, each is a methyl group or an ethyl group; $R_8$ is a hydrogen atom or a halogen atom; and $X^\ominus$ is an anion;

2. at least one red dye of the formula (D)

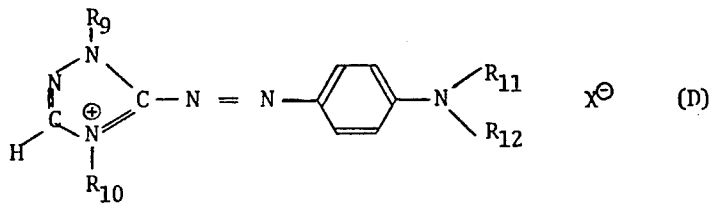

(D)

wherein $R_9$, $R_{10}$, $R_{11}$ and $R_{12}$, which may be the same or different, each is a $(C_1-C_3)$alkyl group or an aralkyl group, in which each of the groups may be substituted with a halogen atom, a hydroxyl group or a lower alkoxy group; and $X^\ominus$ is an anion; and of the formula (E)

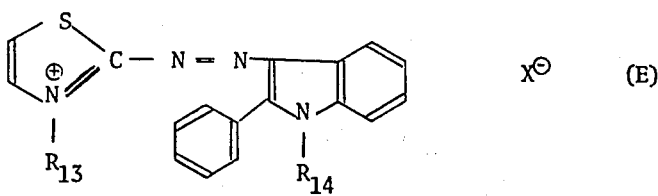

(E)

wherein $R_{13}$ and $R_{14}$, which may be the same or different, each is a $(C_1-C_3)$alkyl group which may be substituted with a halogen atom, a hydroxyl group or a lower alkoxy group; and $X^\ominus$ is an anion;

3. at least one violet to blue dye of the formula (F),

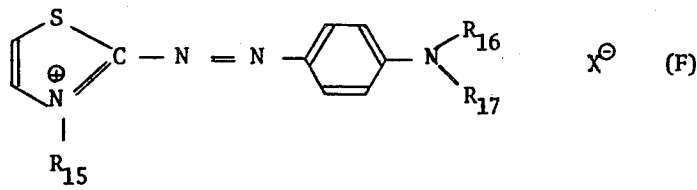

(F)

wherein $R_{15}$ is a $(C_1-C_3)$alkyl group which may be substituted with a halogen atom, a hydroxyl group, a carbamoyl group or a lower alkoxy group; $R_{16}$ and $R_{17}$, which may be the same or different, each is a $(C_1-C_3)$alkyl group or an aralkyl group, in which each of the groups may be substituted with a halogen atom, a hydroxyl group or a lower alkoxy group; and $X^\ominus$ is an anion; and 4. at least one dye of the formula (G),

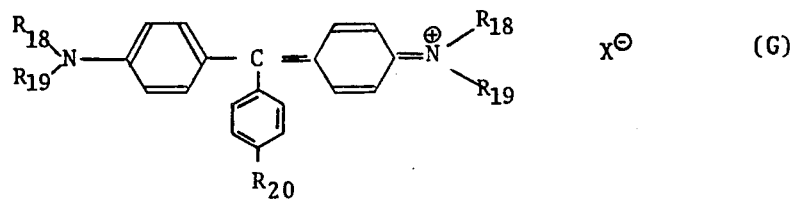

(G)

wherein $R_{18}$ and $R_{19}$, which may be the same or different, each is a $(C_1-C_3)$alkyl or an aralkyl group, in which each of the groups may be substituted with a halogen atom, a hydroxyl group or a cyano group; $R_{20}$ is a hydrogen atom or an amino group which may be substituted with an alkyl group or a phenyl group; and $X^\ominus$ is an anion.

2. The process according to claim 1, wherein the dye of the formula (A) is

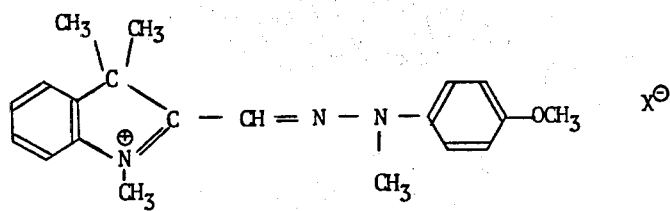
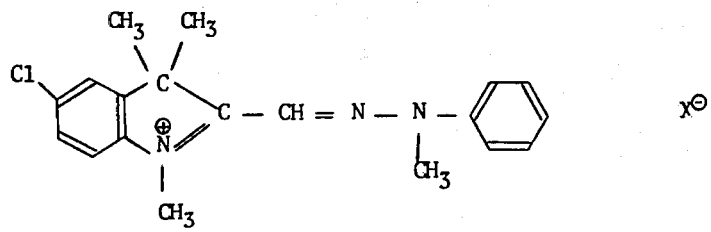
or
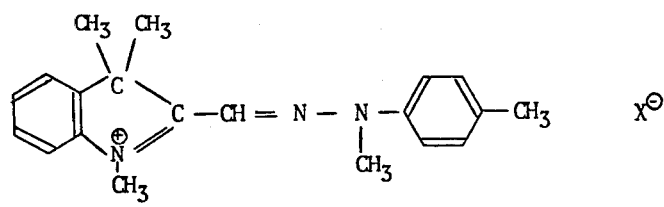
wherein $X^{\ominus}$ is an anion.
3. The process according to claim 1, wherein the dye of the formula (B) is
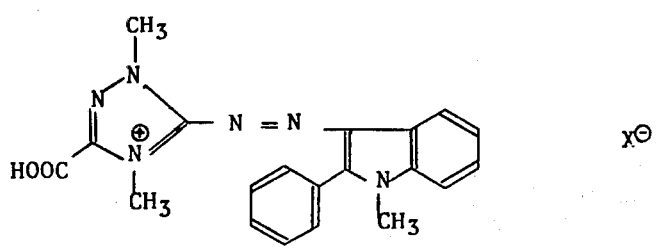
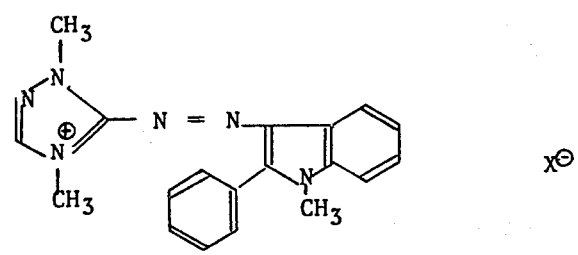
wherein $X^{\ominus}$ is an anion.
4. The process according to claim 1, wherein the dye of the formula (C) is
or
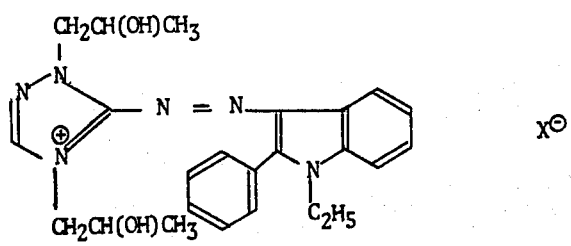

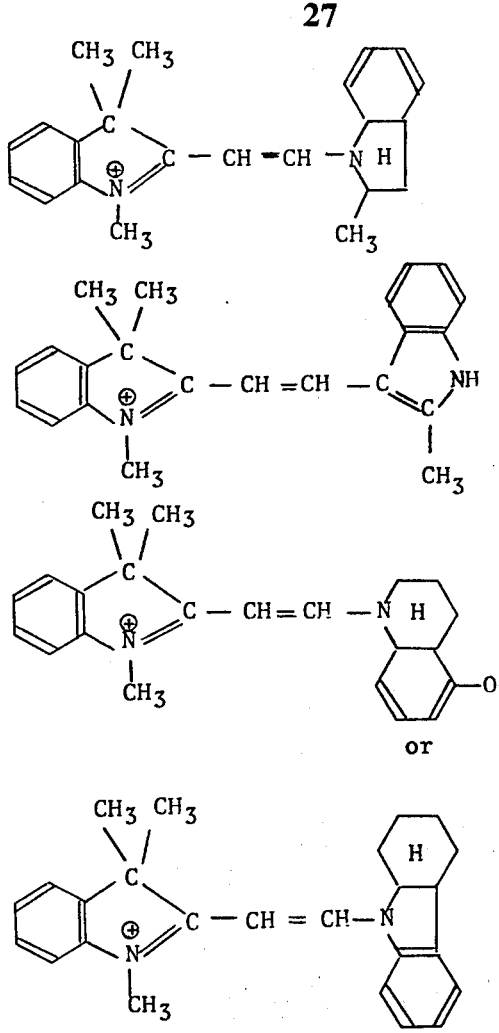
wherein $X^{\ominus}$ is an anion.
5. The process according to claim 1, wherein the dye of the formula (D) is
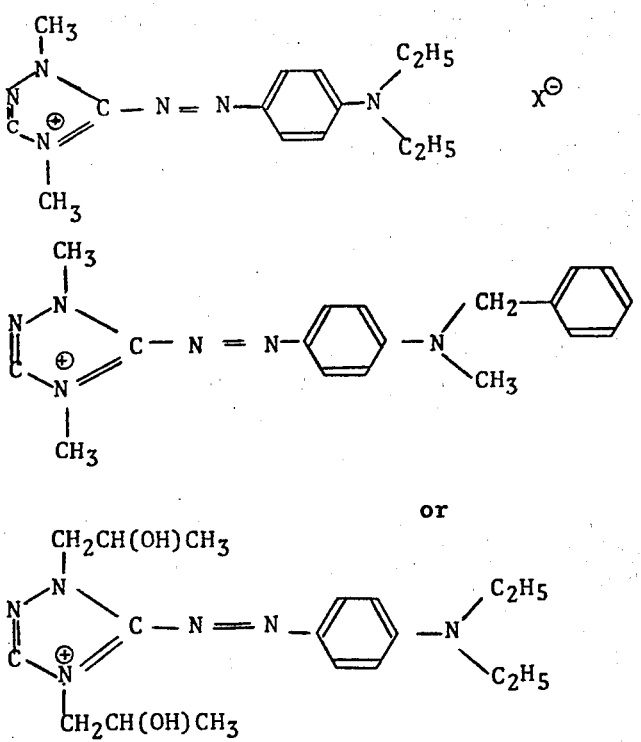
wherein $X^{\ominus}$ is an anion.
6. The process according to claim 1, wherein the dye of the formula (E) is
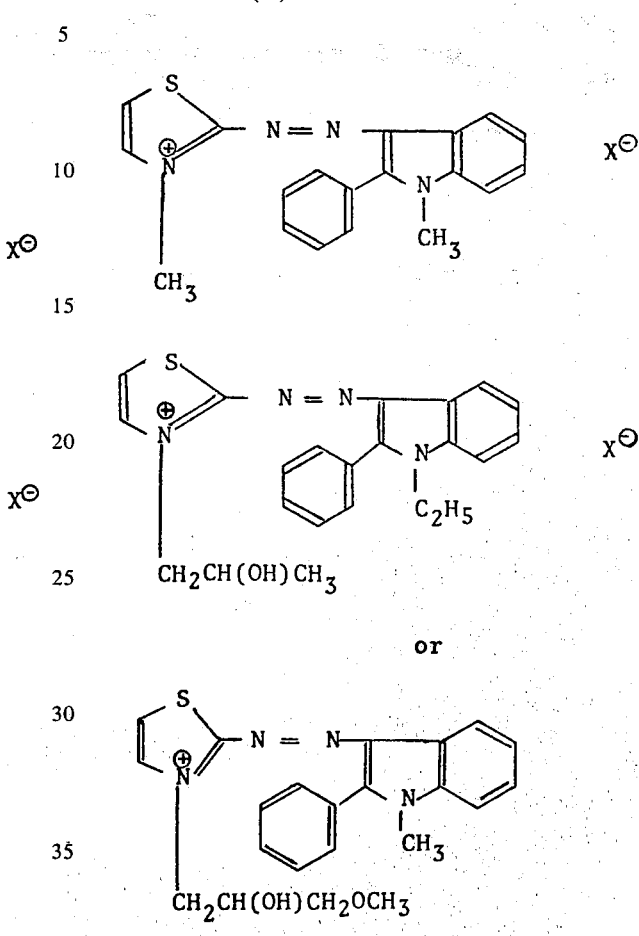
wherein $X^{\ominus}$ is an anion.
7. The process according to claim 1, wherein the dye of the formula (F) is

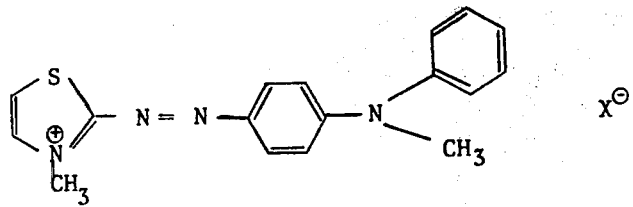
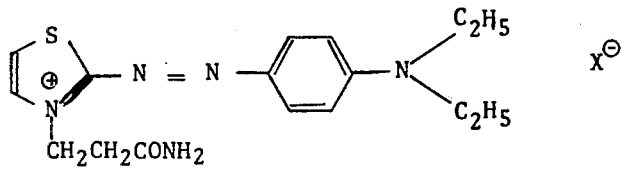
or
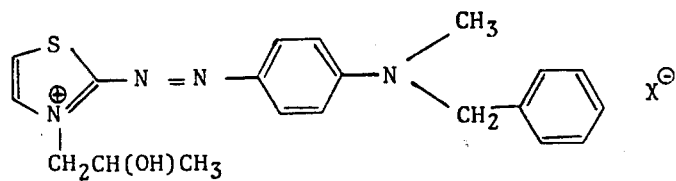
wherein X⊖ is an anion.
8. The process according to claim 1, wherein the dye of the formula (G) is
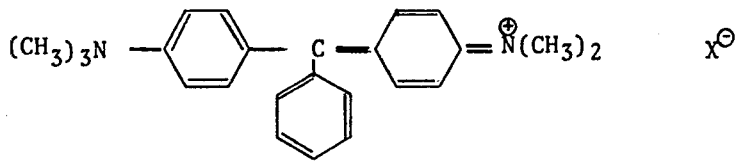
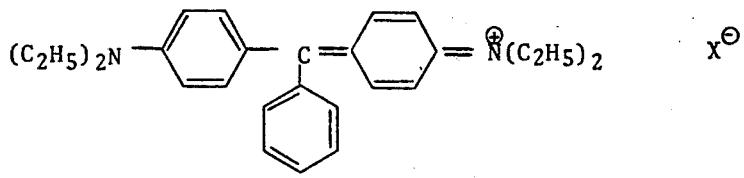
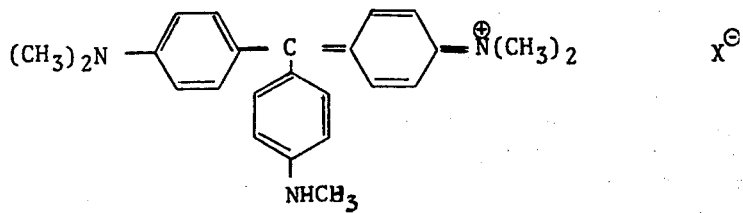
or
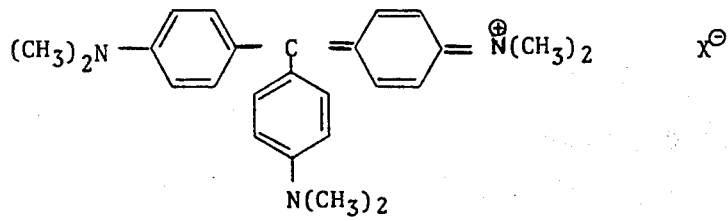
wherein X⊖ is an anion.
9. The process according to claim 1, wherein the amount of each dye in the combination is at least about 1 part by weight based on 1000 parts by weight of said polyester fiber.

10. A black dye composition comprising a combination of four kinds of dyes, the combination comprising
1. at least one yellow or orange dye of the formula (A),

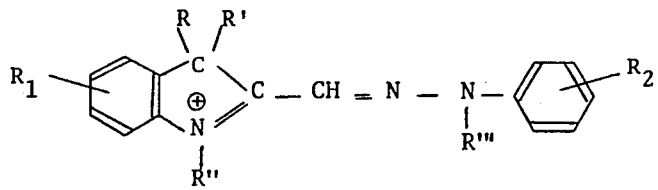  (A)

wherein R, R', R'' and R''', which may be the same or different, each is a methyl group or an ethyl group; $R_1$ is a hydrogen atom or a halogen atom; $R_2$ is a hydrogen atom or a ($C_1$–$C_3$)alkyl group or a ($C_1$–$C_3$) alkoxy group; and $X^\ominus$ is an anion; of the formula (B)

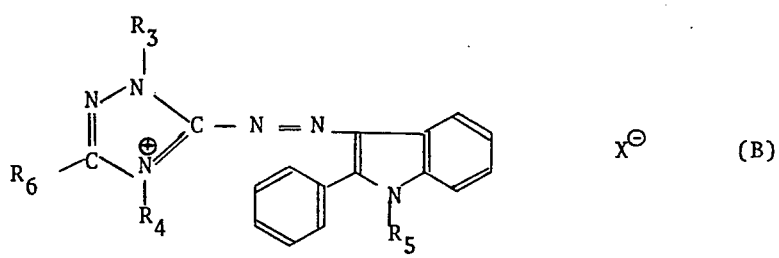  (B)

wherein $R_3$, $R_4$ and $R_5$, which may be the same or different, each is a ($C_1$–$C_3$)alkyl group or an aralkyl group, in which each of the groups may be substituted with a halogen atom, a hydroxyl group or a lower alkoxy group; $R_6$ is a hydrogen atom or a carboxyl group; and $X^\ominus$ is an anion; and of the formula (C)

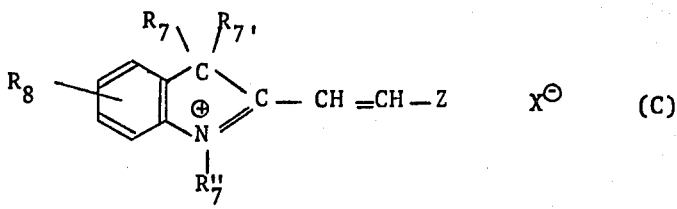  (C)

wherein z is a nitrogen atom-containing monoheterocyclic ring which may be substituted with a lower alkyl group or a lower alkoxy group; $R_7$, $R_7'$ and $R_7''$ which may be the same or different, each is a methyl group or an ethyl group; $R_8$ is a hydrogen atom or a halogen atom; and $X^\ominus$ is an anion;

2. at least one red dye of the formula (D)

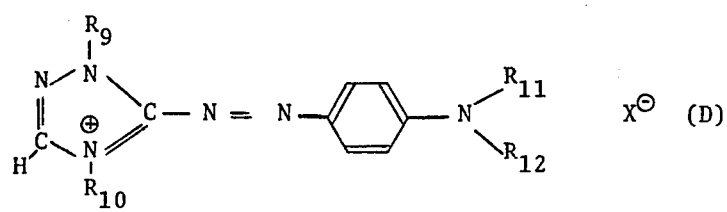  (D)

wherein $R_9$, $R_{10}$, $R_{11}$ and $R_{12}$, which may be the same or different, each is a ($C_1$–$C_3$)alkyl group or an aralkyl group, in which each of the groups may be substituted with a halogen atom, a hydroxyl group or a lower alkoxy group; and $X^\ominus$ is an anion; and of the formula (E)

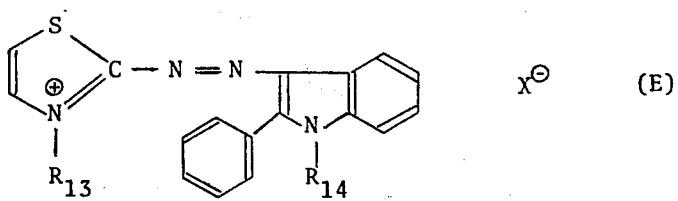 (E)

wherein $R_{13}$ and $R_{14}$, which may be the same or different, each is a ($C_1$–$C_3$)alkyl group which may be substituted with a halogen atom, a hydroxyl group or a lower alkoxy group; and $X^\ominus$ is an anion;

3. at least one violet to blue dye of the (F), (F).

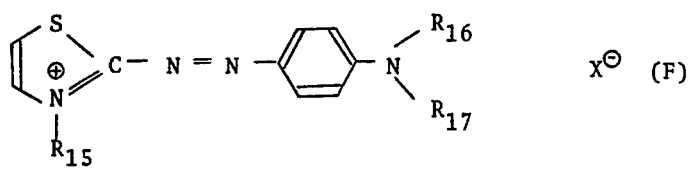

$X^{\ominus}$   (F)

wherein $R_{15}$ is a ($C_1$–$C_3$)alkyl group which may be substituted with a halogen atom, a hydroxyl group, a carbamoyl group or a lower alkoxy group; $R_{16}$ and $R_{17}$, which may be the same or different, each is a ($C_1$–$C_3$)alkyl group or an aralkyl group, in which each of the groups may be substituted with a halogen atom, a hydroxyl group or a lower alkoxy group; and $X^{\ominus}$ is an anion; and 4. at least one dye of the formula (G),

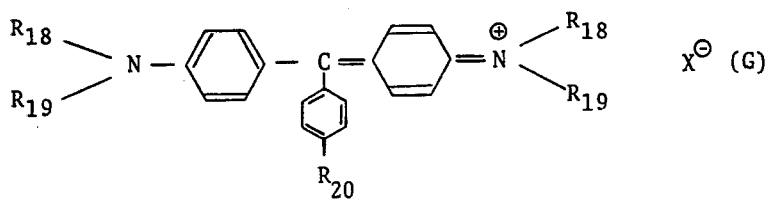

$X^{\ominus}$   (G)

wherein $R_{18}$ and $R_{19}$, which may be the same or different, each is a ($C_1$–$C_3$)alkyl or an aralkyl group, in which each of the groups may be substituted with a halogen atom, a hydroxyl group or a cyano group; $R_{20}$ is a hydrogen atom or an amino group which may be substituted with an alkyl group or a phenyl group; and $X^{\ominus}$ is an anion.

11. The black dye composition according to claim 10, wherein the amount of each dye in the combination is at least 2% by weight based on the total weight of the dyes in the combination.

12. An acid-modified polyester fiber dyed according to the process of claim 1.

* * * * *